US008887926B2

(12) United States Patent
Park et al.

(10) Patent No.: US 8,887,926 B2
(45) Date of Patent: Nov. 18, 2014

(54) NANOPOROUS FILMS AND METHOD FOR MANUFACTURING THE SAME (75) Inventors: Han Oh Park, Daejeon (KR); Jae Ha Kim, Daejoen (KR); Myung Kuk Jin, Daejeon (KR)

(73) Assignee: Bioneer Corporation (KR)

( * ) Notice: Subject to any disclaimer, the term of this patent is extended or adjusted under 35 U.S.C. 154(b) by 592 days.

(21) Appl. No.: 13/201,319

(22) PCT Filed: Mar. 26, 2010

(86) PCT No.: PCT/KR2010/001869
§ 371 (c)(1),
(2), (4) Date: Aug. 12, 2011

(87) PCT Pub. No.: WO2010/110624
PCT Pub. Date: Sep. 30, 2010

(65) Prior Publication Data
US 2012/0000845 A1    Jan. 5, 2012

(30) Foreign Application Priority Data
Mar. 27, 2009    (KR) ........................ 10-2009-0026356

(51) Int. Cl.
*B01D 71/02*    (2006.01)
*B01D 69/00*    (2006.01)
(Continued)

(52) U.S. Cl.
CPC .......... *B01D 71/021* (2013.01); *B01D 67/0041* (2013.01); *B01D 67/0083* (2013.01); *B01D 67/0086* (2013.01); *B01D 67/0088* (2013.01);
(Continued)

(58) Field of Classification Search
CPC ........... B01D 2323/08; B01D 2325/00; B01D 2325/02; B01D 2325/48; B01D 67/0041; B01D 67/0083; B01D 67/0086; B01D 67/0088; B01D 69/02; B01D 69/10; B01D 69/12; B01D 71/021; B01D 71/022; C02F 1/444; C02F 1/505
USPC ............ 210/488, 490, 500.25, 506; 427/244, 427/546, 372.2, 376.6; 977/778, 780, 781
See application file for complete search history.

(56) References Cited

U.S. PATENT DOCUMENTS

| 5,266,207 A | 11/1993 | Boye et al. |
| 2003/0116503 A1 | 6/2003 | Wang et al. |

(Continued)

FOREIGN PATENT DOCUMENTS

| KR | 10-0558966 | 2/2005 |
| KR | 10-2008-0045226 | 5/2008 |

(Continued)

OTHER PUBLICATIONS
International Search Report—PCT/KR2010/001869 dated Nov. 8, 2010.

*Primary Examiner* — John Kim
(74) *Attorney, Agent, or Firm* — Cantor Colburn LLP (57) ABSTRACT Provided is a carbon nanostructure-metal composite nanoporous film in which a carbon nanostructure-metal composite is coated on one surface or both surfaces of a membrane support having micro- or nano-sized pores. A method for manufacturing a carbon nanostructure-metal composite nanoporous film, includes: dispersing a carbon nanostructure-metal composite in a solvent at the presence of a surfactant and coating the carbon nanostructure-metal composite on one surface or both surfaces of a membrane support; and fusing the metal on the membrane support by heating the coated membrane support. The metal in carbon nanostructure-metal composite nanoporous film melts at a low temperature since a size of a metal of the carbon nanostructure-metal composite is several nm to several-hundred nm.

21 Claims, 3 Drawing Sheets (51) Int. Cl.
- *B05D 3/02* (2006.01)
- *B82Y 30/00* (2011.01)
- *B82Y 40/00* (2011.01)
- *B01D 67/00* (2006.01)
- *B01D 69/02* (2006.01)
- *B01D 69/10* (2006.01)
- *B01D 69/12* (2006.01)
- *C02F 1/44* (2006.01)
- *C02F 1/50* (2006.01)

(52) U.S. Cl.
CPC ............ *B01D 69/02* (2013.01); *B01D 69/10* (2013.01); *B01D 69/12* (2013.01); *B01D 71/022* (2013.01); *C02F 1/444* (2013.01); *B01D 2323/08* (2013.01); *B01D 2325/00* (2013.01); *B01D 2325/02* (2013.01); *C02F 1/505* (2013.01); *B01D 2325/48* (2013.01); *Y10S 977/778* (2013.01); *Y10S 977/78* (2013.01); *Y10S 977/781* (2013.01)

USPC ...... 210/500.25; 210/488; 210/490; 210/506; 427/244; 427/372.2; 427/376.6; 427/546; 977/778; 977/780; 977/781

(56) References Cited

U.S. PATENT DOCUMENTS

| | | |
|---|---|---|
| 2005/0263456 A1* | 12/2005 | Cooper et al. ............... 210/660 |
| 2006/0194097 A1 | 8/2006 | Kim et al. |
| 2007/0065638 A1 | 3/2007 | Wang et al. |
| 2008/0041791 A1* | 2/2008 | Cooper et al. ............... 210/695 |

FOREIGN PATENT DOCUMENTS

| | | |
|---|---|---|
| KR | 10-2009-0009419 | 1/2009 |
| KR | 10-2009-0123405 | 12/2009 |
| WO | 2004/005193 | 1/2004 |

\* cited by examiner

NANOPOROUS FILMS AND METHOD FOR MANUFACTURING THE SAME

TECHNICAL FIELD

The present invention relates to a carbon nanostructure-metal composite nanoporous film in which a carbon nanostructure-metal composite is coated on one surface or both surfaces of a membrane support having micro- or nano-sized pores, and a method for manufacturing the same. More particularly, the present invention relates to a carbon nanostructure-metal composite nanoporous film used for manufacturing a membrane for treating water, a field emission display, a hydrogen storage binder, an electrode, super capacitor, an electromagnetic waves shield and a light and high strength application, and a method for manufacturing the same.

BACKGROUND ART

According to enhancing of industries, technology on a membrane with a separating function of high purity is recognized as one of a very important field. Its importance increases in diverse fields including the chemical industry, the food industry, the medicine industry, and medical, biochemical and environmental fields. Especially in the environmental field, as a request for clean water and awareness on water shortage increase, technology using a membrane attracts attention as one of methods for solving the problems.

Meanwhile, a carbon nanostructure is recently discovered and is divided into a carbon nanotube, a carbon nano horn, a carbon graphene and a carbon nanofiber according to its type. In particular, the carbon nanotube is applicable to diverse fields including energy, environment and electronic materials due to superior mechanical strength, heat conductivity and electricity conductivity and chemical stability.

A carbon nanostructure-metal composite is acquired by chemical bonding by inducing a functional group to a carbon nanotube and reacting the induced functional group with metals such as cobalt, copper, nickel, and silver. The carbon nanostructure-metal composite has a superior characteristic in manufacturing structure moldings such as a field emission display, a hydrogen storage binder, an electrode, super capacitor, an electromagnetic waves shield, and light and high strength applications due to a contained metal component.

Methods for manufacturing materials of the carbon nanostructure-metal composite are disclosed in KR Patent Registration No. 0558966 and KR Patent Application Nos. 2007-0072669 and 2008-0049464.

Membranes such as micro filtration (MF) membranes, ultra filtration (UF) membranes, nano filtration (NF) membranes, reverse osmosis (RO) membranes, and ion exchange membranes are used especially in the water treatment field and also used for industrial drainage treatment, water filtering treatment, sewage treatment, waste water treatment, and sea water desalination. A micro filtration membrane is used for a water treatment plant and also used for the sewage treatment by a membrane bio reactor (MBR). The ultra filtration membrane capable of removing bacteria is used for the filtered water treatment and the reverse osmosis membrane is used for a sea water desalination facility. An ion exchange membrane is mainly used for a desalting process. Shizuoka Technology Center developed a nano filtration membrane and was successful in separating green tea components. Yamamoto Group of University of Tokyo developed MBR for advanced water treatment and technology on advanced waste water treatment is planned to be practically applied.

However, membrane fouling is the biggest problem in the membrane. In particular, membrane fouling by microorganism causes deterioration of separating performance to become an obstacle in a membrane lifetime. That is, the membrane fouling by microorganism has a problem of deteriorating the performance of the membrane and reducing its lifetime. Accordingly, researches on a membrane having diverse functions have been continuously progressed to solve the problems.

DISCLOSURE

Technical Problem

It is found that the present invention solves the above-mentioned problems by coating a carbon nanostructure-metal composite on a typical membrane. That is, an object of the present invention is to provide a nanoporous film of a new format, in which a carbon nanostructure-metal composite is coated.

Another object of the present invention is to provide a new nanoporous film having an effect of a catalyst and an effect in removing a microorganism. In addition, another object of the present invention is to provide nanoporous films with a microporous property that a size of pores is controlled according to the carbon nanostructure-metal composite. Still another object of the present invention is to provide a carbon nanostructure-metal composite nanoporous film used for manufacturing a membrane for water treatment, a field emission display, a hydrogen storage binder, an electrode, super capacitor, an electromagnetic waves shield, and light and high strength applications, and a method for manufacturing the same.

Accordingly, the present invention provides the new carbon nanostructure-metal composite nanoporous film by using the carbon nanostructure-metal composite where metal particles of several nm to several-hundred nm are evenly dispersed, and the method for manufacturing the same.

Technical Solution

To achieve the object of the present invention, researches have been repetitively progressed and it is found that a carbon nanostructure-metal composite nanoporous film may be manufactured by using a carbon nanostructure-metal composite being a new material and the manufactured nanoporous films have an antibiotic property. The present invention will be described hereinafter.

The present invention provides the carbon nanostructure-metal composite nanoporous film in which a carbon nanostructure-metal composite is coated on one surface or both surfaces of a membrane support having micro or nano-sized pores.

In addition, the present invention provides a method for manufacturing a carbon nanostructure-metal composite nanoporous film, including: dispersing a carbon nanostructure-metal composite in a solvent at the presence of a surfactant and coating the carbon nanostructure-metal composite on one surface or both surfaces of a membrane support; and fusing the metal on the membrane support by heating the coated membrane support.

A nano metal or a metal oxide of the carbon nanostructure-metal composite may melt or sinter at a low temperature and nanoporous films are manufactured by connecting carbon nanostructures in a network structure by melting or sintering of the metal. The carbon nanostructure and the metal have a size of several nm to several-hundred nm. More particularly, the carbon nanostructure and the metal are formed of a round metal particle and a carbon nanostructure of 1 nm to 500 nm. Since the size of the metal is a nano unit, a melting point of the metal is lower than that of a metal having a general size. Accordingly, when a heat treatment is performed at a relatively low temperature, the metal melts or sinters to connect the carbon nanostructure-metal composite in a network structure and the carbon nanostructure-metal composite and the membrane support are well combined. Microorganisms do not pass through the manufactured nanoporous films due to the size of the pores. Therefore, microorganisms are effectively removed when the nanoporous films are used for the water treatment membrane.

The carbon nanostructure-metal composite of the present invention is characterized in that the carbon nanostructure and the metal or the metal oxide are bonded or combined. To be specific, the carbon nanostructure-metal composite includes a mixture acquired by mixing the carbon nanostructure and the metal or the metal oxide. The carbon nanostructure-metal composite nanoporous films may be manufactured by a mixture combined by a method such as heating or compressing after mixing the carbon nanostructure and the metal or the metal oxide.

The present invention is characterized in that the size of the pores of the carbon nanostructure-metal composite nanoporous films is controlled according to a diameter of the carbon nanostructure. Since the diameter of the carbon nanostructure differs according to types of the carbon nanostructure, the size of the pores is controlled according to the type of the carbon nanostructure. The nanoporous films according to the present invention have pores between the carbon nanostructures and the size of the pores is in a range of 0.1 to 500 nm. In the present invention, the nanoporous films may be applied to a membrane.

The carbon nanostructure-metal composite will be described in detail hereinafter.

The carbon nanostructure-metal composite is manufactured by mixing a metal precursor with a dispersion of the carbon nanostructure dispersed in a reducing solvent and heating the resulting mixture.

The carbon nanostructure-metal composite may be manufactured by mixing the metal precursor with the dispersion further including a stabilizer and heating the resulting mixture.

In the present invention, the carbon nanostructure-metal composite is a combination of the carbon nanostructure and the metals or the metal oxides. The carbon nanostructure may be selected from a single wall carbon nanotube, a double wall carbon nanotube, a multi wall carbon nanotube, a carbon nano horn, a carbon graphene, a carbon nano fiber, or a mixture thereof. More preferably, a single wall carbon nanotube, a double wall carbon nanotube, and a multi wall carbon nanotube may be used. The size of the pores of the nanoporous films manufactured according to the present invention may be controlled according to the type of the carbon nanostructure.

The metal may include at least one metal selected from the group consisting of Mg, Al, K, Ca, Sc, Ti, V, Cr, Mn, Fe, Co, Ni, Cu, Zn, Ga, Rb, Sr, Y, Zr, Mo, Ru, Rh, Pd, Ag, Cd, In, Sn, Cs, Ba, La, Ce, Nd, Sm, Eu, Gd, Tb, Hf, Ir, Pt, Tl, Pb and Bi.

The carbon nanostructure-metal composite may be manufactured by dispersing the carbon nanostructure in a reducing solvent selected from polyols, glycol ethers or a mixture thereof, adding a stabilizer and a metal precursor and heating the resulting mixture.

More specifically, the carbon nanostructure-metal composite is manufactured by the procedures of:

preparing a dispersion by dispersing a carbon nanostructure in a reducing solvent;

preparing a mixed liquid by adding a metal precursor in the dispersion; and reducing the metal precursor by heating the mixed liquid.

The carbon nanostructure-metal composite may be manufactured by further including a stabilizer in the dispersion.

The polyols are selected from the group consisting of glycols, glycerin, threitol, arabitol, glucose, mannitol, galactitol and sorbitol of Formula 1 below and the glycol ethers are selected from compounds of Formula 2 below.

[Formula 1]

[Formula 2]

where $R^1$ and $R^2$ individually represent any one selected from linear or branched $(C_2~C_{10})$ alkylene; $R^3$ represents hydrogen, an allyl, $(C_1~C_{10})$ alkyl, $(C_5~C_{20})$ aryl, or $(C_6~C_{30})$ aralkyl group; $R^4$ represents any one selected from an allyl, $(C_1~C_{10})$ alkyl, $(C_5~C_{20})$ aryl, $(C_6~C_{30})$ aralkyl group, or $(C_2~C_{10})$ alkyl carbonyl group and alkyl of the alkyl carbonyl group may have a double bond at a carbon chain; n and m individually represent an integer of 1 to 100.

Examples of the glycols include ethylene glycol, diethylene glycol, triethylene glycol, tetraethylene glycol, polyethylene glycol, propylene glycol, dipropylene glycol, polypropylene glycol, and hexylene glycol. The ethylene glycol is preferred but the invention is not limited to the examples.

Examples of compounds included in the glycol ethers include methyl glycol, methyl diglycol, methyl triglycol, methyl polyglycol, ethyl glycol, ethyl diglycol, butyl glycol, butyl diglycol, butyl triglycol, butyl polyglycol, hexyl glycol, hexyl diglycol, ethyl hexyl glycol, ethyl hexyl diglycol, allyl glycol, phenyl glycol, phenyl diglycol, benzil glycol, benzil diglycol, methyl propylene glycol, methyl propylene diglycol, methyl propylene triglycol, propyl propylene glycol, propyl propylene diglycol, butyl propylene glycol, butyl propylene diglycol, phenyl propylene glycol, methyl propylene glycol acetate and poly methyl glycol but the invention is not limited to the examples. In the present invention, it is preferred to use the reducing solvent of the glycols mixed with glycol ethers. To be specific, it is preferred to use glycols mixed with methyl poly glycols.

The stabilizer may be selected from a surfactant, a water soluble polymer, amines and a mixture thereof. Detailed examples of the water soluble polymer include polyvinyl pyrrolidone and amines may be selected from a primary amine, a secondary amine, a tertiary amine, an aromatic amine and a mixture thereof. More detailed examples include an oleylamine.

The metal precursor is selected from the group consisting of silver nitrate, silver acetyl acetonate, silver acetate, silver carbonate, silver chloride, aluminum hydroxide, aluminum chloride, aluminum acetyl acetonate, aluminum acetate, aluminum nitrate, manganese carbonate, manganese chloride, manganese nitrate, manganese acetyl acetonate, manganese acetate, zinc chloride, zinc nitrate, zinc acetate, zinc acetyl acetonate, cobalt acetyl acetonate, cobalt acetate, copper acetyl acetonate, copper acetate, nickel acetyl acetonate, nickel acetate, iron acetyl acetonate, iron acetate, titanium acetate, titanium acetyl acetonate and hydrate thereof.

As described above, in the present invention, the carbon structure-metal composite may use a carbon nanostructure-metal composite formed of a round metal particle of 1 to 500 nm.

The carbon nanostructure-metal composite nanoporous film of the present invention will be described in detail hereinafter.

According to the present invention, the carbon nanostructure-metal composite is manufactured through compressing, heating or sintering after coating the carbon nanostructure-metal composite on the membrane support and provides carbon nanostructure-metal composite nanoporous films of a structure having nanopores between a carbon nanostructure. A size of the nanopores is in the range of 0.1 nm to 500 nm and microorganisms do not pass through the nanoporous films. Accordingly, microorganisms may be removed. More specifically, the nanoporous films according to the present invention may be used for a membrane for antibiotic water treatment.

The present invention provides a method for manufacturing a carbon nanostructure-metal composite nanoporous film, including:

coating a carbon nanostructure-metal composite on one surface or both surfaces of a membrane support after dispersing the carbon nanostructure-metal composite in a solvent and a surfactant; and fusing the metal on the membrane support by heating the coated membrane support.

A High Efficiency Particulate Air (HEPA) filter, an Ultra Low Particulate Air (ULPA) filter, a glass fiber filter, a glass powder sintering filter, a polymer non-woven fabric filter, a Teflon membrane filter, a metal powder sintering filter and a metal wire weaving filter may be used for the membrane support and the present invention is not limited to the examples.

In the present invention, the coating is characterized in that the carbon nanostructure-metal composite is filtered in the membrane support and the carbon nanostructure-metal composite remaining in the membrane support is compressed.

In the present invention, the metal has a size of 1 to 500 nm and melts at a low temperature when the metal particles have a nano size. Accordingly, the present invention performs a heat treatment at a temperature of 100 to 700° C., more preferably, 100 to 500° C. When the metal is silver, heat treatment is performed at a temperature of 100 to 300° C.

The carbon nanostructure-metal composite nanoporous films of the network structure may be manufactured by connecting carbon nanostructure-metal composites by melting the metal particles. In addition, the present invention has a benefit that the carbon nanostructure-metal composite may be fused with the membrane support without melting of the membrane support through heat treatment at the above-mentioned temperature.

To be specific, the carbon nanostructure-metal composite is combined with the membrane support based on a principle below. The carbon nanostructure itself does not have a bonding force. However, the carbon nanostructure-metal composite, which is bonded with the metal, melts at a low temperature when a metal particle has a nano size. The carbon nanostructure-metal composites are connected to each other by heat treatment by using the metal component and fused with the membrane support to manufacture carbon nanostructure-metal composite nanoporous films of a network structure.

More specifically, in the present invention, the metal may be silver and nanoporous films containing silver may be used for a membrane for antibacterial water treatment. When the silver is present at an amount of 5 to 70% by weight, based on the total amount of the carbon nanostructure, the silver allows the nanoporous films to show an antibacterial effect effectively.

When the content of the silver is lower than 5% by weight, it is difficult to form a carbon nanotube of a network structure. When the content of the silver is higher than 70% by weight, there is a problem that liquid does not smoothly flow since the silver blocks the membrane.

When the carbon nanotube-silver composite nanoporous film manufactured by the present invention is used as being a membrane, a nano-membrane increasing a lifetime of the membrane without blocking of the membrane due to bacteria may be provided.

The carbon nanostructure-metal composite may be mixed and dispersed at an amount of 10 to 50 parts by weight based on 100 parts by weight of a surfactant, and the carbon nanostructure-metal composite may be effectively dispersed without its tangling within the range.

The solvent may be any one selected from the group consisting of water, alcohol, polyols, glycol ethers and a mixture thereof. The alcohol may be any one selected from the group consisting of methyl alcohol, ethanol, propyl alcohol, butanol, pentanol, hexanol, and octyl alcohol, and more preferably propyl alcohol.

Since detailed description on the polyols and the glycol ethers is provided in the description on the method for manufacturing the carbon nanostructure-metal composite, it will not be provided herein.

The surfactant used for the present invention may be selected from a non-ionic surfactant, a cationic surfactant, an anionic surfactant and a mixture thereof.

More specifically, examples of the surfactant include cetyltrimethylammonium bromide, cetyltrimethylammonium chloride, stearic acid, methyl glucoside, octyl glucoside, polyoxyethylene sorbitan monolaurate, polyoxyethylene sorbitan monopalmitate, polyoxyethylene sorbitan monostearate, polyoxyethylene sorbitan monooleate, sorbitan monolaurate, ethylene glycol monolaurate, propylene glycol monolaurate, triglycerol monostearate or a mixture thereof, more preferably cetyltrimethylammonium bromide or cetyltrimethylammonium chloride, but the present invention is not limited to the examples.

In the manufacturing method according to the present invention, all of the known methods may be used as the method for dispersing the carbon nanostructure-metal composite in the solvent. However, a dispersing method by ultrasonic treatment is preferred since it is easy and shows a superior dispersibility. It may be confirmed through an electron microscope that the carbon nanostructure-metal composites are generally tangled to each other. Since the tangling in the carbon nanostructure-metal composite prevents even dispersion of the carbon nanostructure-metal composite in coating on the membrane support, the ultrasonic treatment is a necessary process in manufacturing a carbon nanostructure-metal composite nano membrane.

In the manufacturing method according to the present invention, examples of the methods for coating on one surface or both surfaces of the membrane support include spin coating, dip coating, spray coating, bar coating, screen printing and a coating method through filtering by the support but the present invention is not limited to the examples.

The coated membrane support is heated for 3 to 10 hours at 100 to 700° C. to form a network structure through melting or sintering of the metal. Examples of the heating method include a heating method in a general oven at a low temperature, a method of passing through a hot roller, and a heating method in an electric furnace but the present invention is not limited to the examples.

Figure 1:
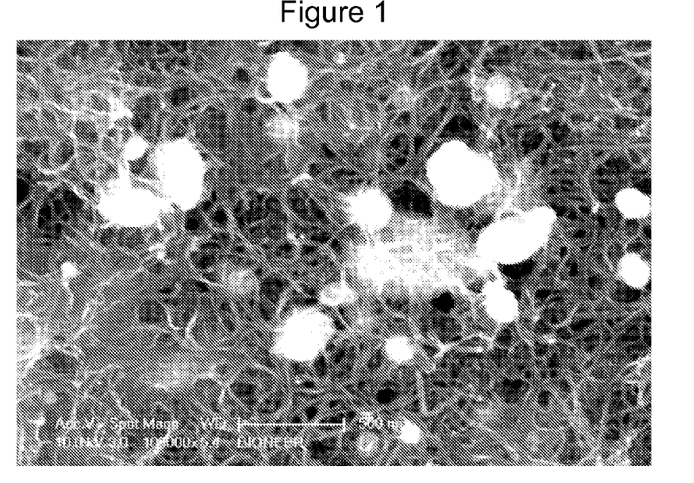
FIG. 1 is a photograph showing a carbon nanostructure-silver composite nanoporous film manufactured in Example 1 through a Scanning Electron Microscope (SEM).
Figure 2:
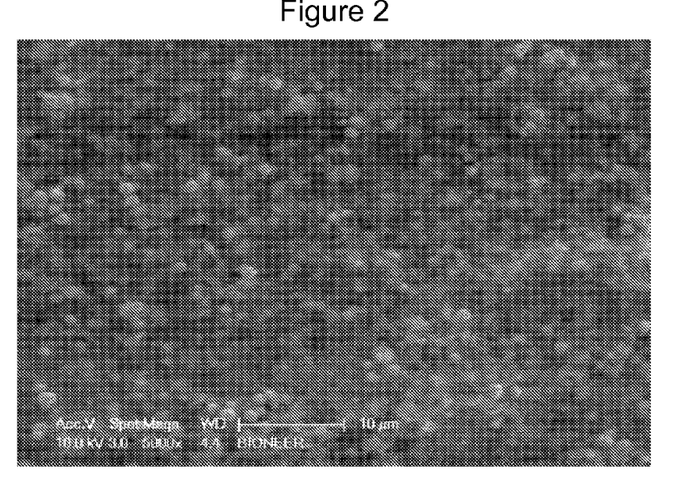
FIG. 2 is a photograph showing a carbon nanostructure-cobalt composite nanoporous film manufactured in Example 2 through SEM.

FIGS. 1 and 2 are Scanning Electron Microscope (SEM) photographs showing the carbon nanotube-metal composite nanoporous film manufactured according to the exemplary embodiment of the present invention. With reference to FIGS. 1 and 2, it is confirmed that the nanoporous film forms a network structure by melting of the metal particle and pores having a nano size are formed.

Advantageous Effects

A carbon nanostructure-metal composite nanoporous film according to the present invention has a benefit that a size of pores in nanoporous films is controlled according to the size of a carbon nanostructure.

The carbon nanostructure-metal composite nanoporous film according to the present invention has a characteristic that it melts at a low temperature since a size of a metal of the carbon nanostructure-metal composite is several nm to several-hundred nm. Accordingly, nanoporous films of a new format manufactured by connecting the metal and the carbon nanostructure through the heat treatment at a low temperature and fusing the metal with a membrane support, and a method for manufacturing the same are provided. Although the heat treatment is performed at a low temperature, the carbon nanostructure may be well attached to the membrane support since the metal melts or sinters to connect the carbon nanostructure-metal composite in the network structure. Since microorganisms do not pass through the manufactured nanoporous films due to the size of the pores, the microorganism may be effectively removed when the nanoporous films are used for a water treatment membrane.

When the nanoporous films according to the present invention are used as the water treatment membrane, it is prevented that a membrane lifetime is reduced due to clogging by a congregation of bacteria. In addition, since substances causing water and air pollution are effectively removed, the nanoporous films according to the present invention may be used as a filter for purifying water and air.

DESCRIPTION OF DRAWINGS

The above and other objects, features and advantages of the present invention will become apparent from the following description of preferred embodiments given in conjunction with the accompanying drawings, in which.

BEST MODE

Hereinafter, detailed description of the present invention will be provided with reference to examples but the present invention is not limited to the Examples below.

Preparation Example 1

Preparation of Carbon Nanotube-Silver Composite

A thin multi wall carbon nanotube of 0.3 g (Nanotec, Thin Multi-wall CNT grade) was put into a 500 ml round flask and ethylene glycol (EG) of 280 ml was added to a round flask reactor. The mixture was stirred for 30 minutes by installing a stirring tool. The reactor was put into an ultrasonic washer and the carbon nanotube was dispersed in the ethylene glycol by using ultrasonic for 3 hours. A temperature of the reactor was controlled not to be over 50° C. After finishing the ultrasonic treatment, the stirring tool was installed again and a thermometer and condenser was connected to a reactor for cooling.

Poly vinyl pyrrolidone (PVP, Manufacturing company: Fluka, average molecular weight (Mw): 40,000) of 1.68 g and oleylamine of 5.6 ml were added while stirring the reactor and silver nitrate ($AgNO_3$) 1.102 g was subsequently added. A vacuum pump was connected to the reactor to remove air inside the reactor and substitute nitrogen for air. Inflow of oxygen was blocked by continuously supplying nitrogen. A mantle was installed in a lower portion of the flask. The mixture inside the reactor was warmed to a temperature of 200° C. for 40 minutes and reacted for 1 hour.

After finishing the reduction reaction, the mixture in the reactor was slowly cooled to a room temperature for 3 hours. Synthesized carbon nanotube-silver composite was filtered by using a filter sheet and washed with ethyl acetate and hexane to obtain the carbon nanotube-silver composite. According to an analysis result of the carbon nanotube-silver composite through SEM, it was confirmed that particles of silver have a round shape and a regular size and are evenly dispersed.

Preparation Example 2

Preparation of Carbon Nanotube-Cobalt Composite

A carbon nanotube (Hanwha nanotec, CM-95) of 0.3 g was put into a 500 ml round flask, triethylene glycol (TEG) of 128 ml was put into a reactor. The mixture was stirred for 30 minutes by installing a stirring tool. The reactor was put into an ultrasonic washer and the carbon nanotube was dispersed for 3 hours by using ultrasonic.

A temperature of the reactor was controlled not to be over 50° C. After finishing the ultrasonic treatment, the stirring tool was installed again and a thermometer and condenser was connected to a reactor for cooling. Methyl poly glycol (MPG, $CH_3(OCH_2CH_2)nOH$, n=4~5, Hannong Chemicals Inc., Product name: MPG) of 4.26 ml was added into a flask reactor while stirring a reactor solution.

Subsequently, cobalt acetyl acetonate of 3.48 g was additionally added. A vacuum pump was connected to the reactor to remove air inside the reactor and substitute nitrogen for air. Inflow of oxygen was blocked by continuously supplying nitrogen. A mantle was installed in a lower portion of the flask. The mixture inside the reactor was warmed to a temperature of 280° C. for 1 hour and the temperature was maintained for 1 hour.

After finishing the reduction reaction, the mixture in the reactor was slowly cooled to a room temperature for 3 hours. A synthesized composite was filtered by using a filter sheet and washed with ethanol several times to obtain a carbon nanotube-cobalt composite. According to an analysis result of the carbon nanotube-cobalt composite through SEM, it was confirmed that particles of cobalt have a round shape and a regular size and were evenly dispersed.

Preparation Example 3

Preparation of Carbon Nanotube-Copper Composite

A carbon nanotube-copper composite was manufactured by performing Preparation Example 3 under the same condition as Preparation Example 2 except that copper acetyl acetonate of 4.04 g was used as metal salts. According to an analysis result of the manufactured carbon nanotube-copper composite through SEM, it was confirmed that particles of copper have a round-like shape and a regular size and were evenly dispersed.

Preparation Example 4

Preparation of Carbon Nanotube-Nickel Composite

A carbon nanotube-nickel composite was manufactured by performing Preparation Example 4 under the same condition as Preparation Example 2 except that nickel acetyl acetonate of 3.48 g was used as metal salts. According to an analysis result of the manufactured carbon nanotube-nickel composite through SEM, it was confirmed that particles of nickel have a round-like shape and a regular size and were evenly dispersed.

Example 1

Preparation of Carbon Nanotube-Silver Composite Nanoporous Films

A carbon nanotube-silver composite (0.5 g) manufactured in the Preparation Example 1, ultra-pure water of 100 ml, cetyltrimethylammonium chloride (28 wt %, 3 ml) were put in a round flask of 250 ml and dispersed for 2 hours by using ultrasonic at a temperature of 25 to 30° C.

After cutting a HEPA filter sheet having a pores size of 0.3 μm in a circular shape of 6.2 cm and installing the HEPA filter sheet in a filter, above dispersion solution of 30 ml was filtered.

When filtered solids by the filter sheet were coated on the filter sheet, the silver was fused on the filter sheet by inserting and compressing the solids coated on the filter sheet between uniform glass plates and heating them in an oven at a temperature of 150° C. for 8 hours.

After cooling the filter sheet fused with the silver to a room temperature, cutting the filter sheet to have a diameter of 5 cm and installing the cut filter sheet to a filtering device (Advantec KP-47H), a surfactant (cetyltrimethylammonium chloride) and residues were washed by ethanol of 50 ml and ultra-pure water of 50 ml. The carbon nanotube-silver composite nanoporous films were manufactured by secondary heating at a temperature of 150° C. in the oven. FIG. 1 was a photograph showing the manufactured carbon nanotube-silver composite nanoporous films through SEM. It was confirmed that silver particles were dispersed in a carbon nanotube.

Example 2

Preparation of Carbon Nanotube-Cobalt Composite Nanoporous Films

A carbon nanotube-cobalt composite (0.5 g) manufactured in the Preparation Example 2, ultra-pure water of 100 ml, cetyltrimethylammonium chloride (28 wt %, 3 ml) were in a round flask of 250 ml, and dispersed by using ultrasonic at a temperature of 25 to 30° C. for 2 hours.

After cutting a HEPA filter sheet having a pore size of 0.3 μm in a circular shape of a 6.2 cm diameter and installing the HEPA filter sheet in a filter, above dispersion solution of 30 ml was filtered. When filtered solids by the filter sheet were coated on the filter sheet, the cobalt was fused on the filter sheet by inserting and compressing it between uniform glass plates and heating it in an oven at 450° C. for 8 hours.

After cooling the filter sheet fused with the cobalt to a room temperature, cutting the filter sheet to have a diameter of 5 cm and installing the cut filter sheet to a filtering device (Advantec KP-47H), a surfactant (cetyltrimethylammonium chloride) and residues were washed by ethanol of 50 ml and ultra-pure water of 50 ml. FIG. 2 was a photograph showing the manufactured carbon nanotube-cobalt composite nanoporous films through SEM. It was confirmed that cobalt particles were dispersed in a carbon nanotube.

Example 3

Preparation of Carbon Nanotube-Copper Composite Nanoporous Films

A carbon nanotube-copper composite nanoporous film was manufactured under the same condition as Example 2 except that a carbon nanotube-copper composite synthesized in Preparation Example 3 was used as a composite. According to a result of analysis on the manufactured carbon nanotube-copper composite nanoporous films through SEM, it was confirmed that copper particles were dispersed in a carbon nanotube.

Example 4

Preparation of Carbon Nanotube-Nickel Composite Nanoporous Films

A carbon nanotube-nickel composite nanoporous films was manufactured under the same condition as Example 2 except that a carbon nanotube-nickel composite synthesized in Preparation Example 4 was used as a composite. According to a result of analysis on the manufactured carbon nanotube-nickel composite nanoporous films through SEM, it was confirmed that nickel particles were dispersed in a carbon nanotube.

Test Example 1

Antibacterial Test of Carbon Nanotube-Silver Composite Nanoporous Films a) Antibacterial Test of *Staphylococcus aureus* (*S. aureus*)

*S. aureus* was cultured at a temperature of 37° C. for 12 hours by using a liquid culture of Brain Heart Infusion (BHI). The culture medium of 100 ul, which was diluted to have bacteria of 103 CFU/ml, was smeared on BHI plate medium and was put on a nano membrane manufactured in Example 1 and was cultured at a temperature of 37° C. for 24 hours. It was determined whether there was antibacterial activity by observing whether colony was proliferated on a portion, in which a membrane was put, after culturing.

For the colony tested, it was revealed that no colony was formed on the plate on which the carbon nanotube-silver membrane was put, which indicated that the carbon nanotube-silver membrane showed an antibacterial effect.

b) Antibacterial Test of *E. coli*

This example was performed in the same manner as described in (a) of Test Example 1, except that *Escherichia coli* (*E. coli*) was used instead of *S. aureus*. As a result, it was revealed that no colony was formed on the plate on which the carbon nanotube-silver membrane was put, which indicated that the carbon nanotube-silver membrane showed an antibacterial effect.

Test Example 2

Bacteria Filter Test on Carbon Nanotube-Silver Composite Nanoporous Films

S. aureus was cultured at 37° C. for 12 hours in a brain heart infusion (BHI) liquid medium.

The cultured liquid medium was filtered through the carbon nanotube-silver composite nanoporous film prepared in Example 1, and the filtrate was smeared on the BHI plate medium and cultured at 37° C. for 12 hours. It was determined that the growth of the bacterial colonies means that the liquid medium was not filtered through the nanoporous film, and no growth of the bacterial colonies means that the liquid medium was filtered through the nanoporous film.

As a test result, it was revealed that when the filtrate obtained by filtering the S. aureus culture solution was smeared on the BHI plate medium, no colonies were not formed on the plate medium, which indicated that S. aureus was filtered through the carbon nanotube-silver composite nanoporous film.

Test Example 3

Bacteria Filter Test on Carbon Nanotube-Silver Composite Nanoporous Films

E. coli was cultured at a temperature of 37° C. for 12 hours in a Brain Heart Infusion (BHI) liquid culture. Then, this example was performed in the same manner as described in Test Example 2, except that E. coli was used instead of S. aureus.

The cultured liquid medium was filtered through the carbon nanotube-silver composite nanoporous film prepared in Example 1, and the filtrate was then smeared on the BHI plate medium and cultured at 37° C. for 12 hours. As a test result, it was revealed that when the filtrate obtained by filtering the E. coli culture solution was smeared on the BHI plate medium, no colonies were not formed on the plate medium, which indicated that E. coli was filtered through the carbon nanotube-silver composite nanoporous film.

Test Example 4

Virus Filter Test on Carbon Nanotube-Silver Composite Nanoporous Films

A virus filter test on the carbon nanotube-silver composite nanoporous films was performed by using enterovirus (EV).

EV was an enveloped virus that had single-stranded RNA genome with the genomic size of 28 to 30 nm. Coxsackievirus was one of the enteroviruses that had been known to have 29 serotypes and was divided into two types: Types A and B. This filter test was performed using Coxsackievirus A9 type (ATCC-VR186).

First, Coxsackievirus A9 was inactivated through heating at 100° C. for 20 minutes, and then used in this filter test. 1000 ul of the viral solution was filtered through the carbon nanotube-silver composite nanoporous films for 1 hour, and 250 ul of the filtered viral solution was fractioned, and RNA was extracted from the viral solution using an Accuprep® Viral RNA extraction kit (Bioneer, Korea).

As the same time, RNA was extracted from 250 ul of the non-filtered viral solution, which was used as the control. The final volume of the RNA extraction solution was adjusted to a volume of 50 ul, and 45 ul of the RNA extraction solution was used in a Real-Time PCR test. Coxsackieviral RNA was amplified in the Real-Time PCR test using an Accupower® Enterovirus Real-Time RT-PCR kit (Bioneer, Korea) in order to confirm the presence of the coxsackievirus.

Figure 3:
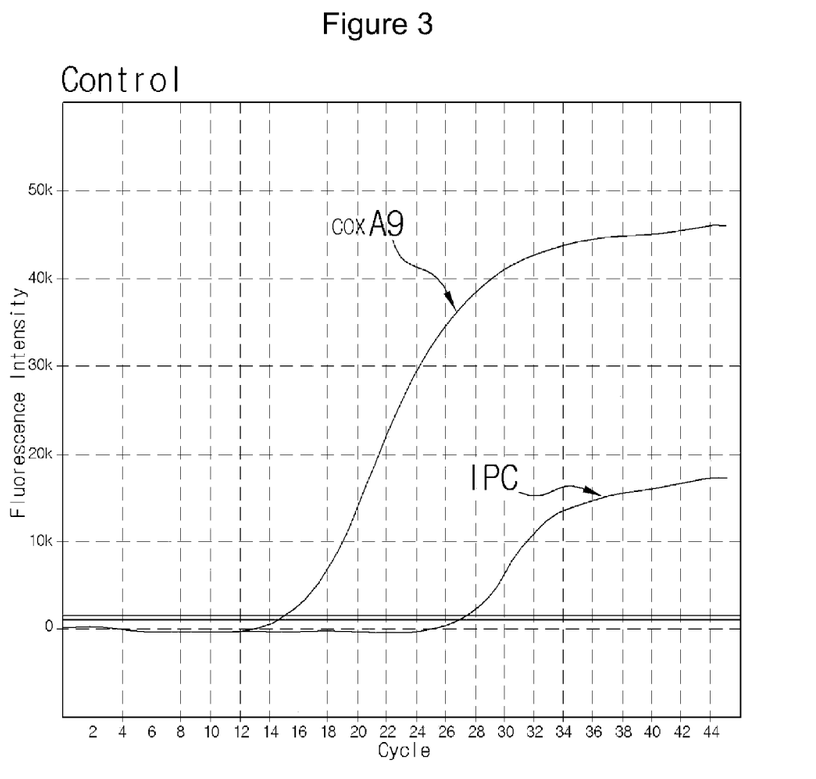
FIG. 3 is a graph showing a result of a Real-Time Polymerase Chain Reaction (PCR) of a control according to Test Example 4.
Figure 4:
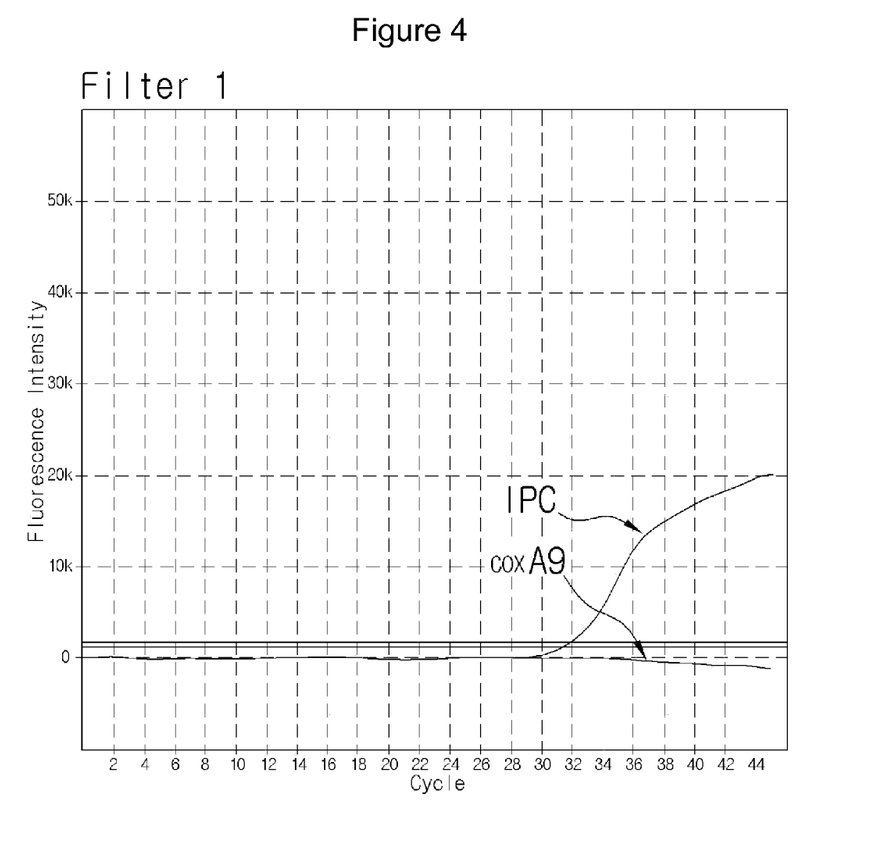
FIG. 4 is a graph showing a result of Real-Time PCR of filtered liquid after filtering Coxsakie virus of the carbon nanotube-silver composite nanoporous film according to Test Example 4.

As a test result, it was confirmed that the amplification of the control was identical to that as shown in FIG. 3, and the filtration test result of the nanoporous films (Experimental groups) showed that there were no amplified Coxsackievirus A9 colonies as shown in FIG. 4. There was an amplified internal positive control (IPC), which indicated that there was no Coxsackievirus. Accordingly, the filtration of the coxsackieviral solution confirmed that Coxsackievirus was not passed through the filter.

The invention claimed is:

1. A carbon nanostructure-metal composite nanoporous film of a network structure, comprising:
   a membrane support having micro or nano-sized pores; and
   a carbon nanostructure-metal composite coated on one surface or both surfaces of the membrane support, wherein the metal of the carbon nano structure-metal composite is connected to the surface of the membrane support to form a network structure of carbon nanostructure-metal composite nanoporous film by melting or sintering of the metal.

2. The carbon nanostructure-metal composite nanoporous film of a network structure of claim 1, wherein the carbon nano structure-metal composite carbon is formed by bonding or combination of a nanostructure and a metal or a metal oxide.

3. The carbon nanostructure-metal composite nanoporous film of a network structure of claim 2, the pore size is in a range of 0.1 to 500 nm.

4. The carbon nanostructure-metal composite nanoporous film of a network structure of claim 2, wherein the carbon nanostructure-metal composite is manufactured by mixing a metal precursor with a dispersion of the carbon nanostructure dispersed in a reducing solvent and heating the resulting mixture.

5. The carbon nanostructure-metal composite nanoporous film of a network structure of claim 4, wherein the carbon nano structure-metal composite is manufactured by mixing the metal precursor with the dispersion further including a stabilizer and heating the resulting mixture.

6. The carbon nanostructure-metal composite nanoporous film of a network structure of claim 4, wherein the reducing solvent is selected from the group consisting of polyols, glycol ethers or a mixture thereof; the polyols are selected from the group consisting of glycols, glycerin, threitol, arabitol, glucose, mannitol, galactitol and sorbitol of Formula 1; and the glycol ethers are selected from the group consisting of compounds of Formula 2.

$$H—(OR^1)_n—OH \quad \text{[Formula 1]}$$

$$R^4—(OR^2)_m—OR^3 \quad \text{[Formula 2]}$$

where $R^1$ and $R^2$ are individually selected from the group consisting of linear or branched ($C_2$~$C_{10}$) alkylene; $R^3$ represents hydrogen, an allyl, ($C_1$~$C_{10}$) alkyl, ($C_5$~$C_{20}$) aryl, or ($C_6$~$C_{30}$) aralkyl group; $R^4$ is selected from the group consisting of an allyl, ($C_1$~$C_{10}$) alkyl, ($C_5$~$C_{20}$) aryl, ($C_6$~$C_{30}$) aralkyl group, or a ($C_2$~$C_{10}$) alkyl carbonyl group and alkyl of the alkyl carbonyl group may have a double bond at a carbon chain; n and m are individually an integer of 1 to 100.

7. The carbon nanostructure-metal composite nanoporous film of a network structure of claim 2, wherein the carbon nanostructure is selected from the group consisting of a single wall carbon nanotube, a double wall carbon nanotube, a multi wall carbon nanotube, a carbon nano horn, a carbon graphene, a carbon nano fiber and a mixture thereof.

8. The carbon nanostructure-metal composite nanoporous film of a network structure of claim 2, wherein the metal comprises at least one metal selected from the group consisting of Mg, Al, K, Ca, Sc, Ti, V, Cr, Mn, Fe, Co, Ni, Cu, Zn, Ga, Rb, Sr, Y, Zr, Mo, Ru, Rh, Pd, Ag, Cd, In, Sn, Cs, Ba, La, Ce, Nd, Sm, Eu, Gd, Tb, Hf, Ir, Pt, Tl, Pb and Bi.

9. The carbon nanostructure-metal composite nanoporous film of a network structure of claim 1, wherein the carbon nano structure-metal composite is coated on the membrane support and is then subject to compressing, heating or sintering.

10. The carbon nanostructure-metal composite nanoporous film of a network structure of claim 1, wherein the carbon nanostructure-metal composite nanoporous films are used for antibacterial water treatment.

11. A method for manufacturing a carbon nanostructure-metal composite nanoporous film, comprising:
dispersing a carbon nanostructure-metal composite in a solvent at the presence of a surfactant and coating the carbon nanostructure-metal composite on one surface or both surfaces of a membrane support having micro or nano-sized pores; and
fusing the metal on the membrane support by heating the coated membrane support.

12. The method of claim 11, wherein the metal has a size of 1 to 500 nm.

13. The method of claim 11, wherein the heat treatment is performed at a temperature of 100 to 700° C.

14. The method of claim 11, wherein the metal is silver.

15. The method of claim 11, wherein the heat treatment is performed at a temperature of 100 to 300° C. in case of silver metal.

16. The method of claim 14, wherein the silver is present at an amount of 5 to 70% by weight, based on the total amount of the carbon nanostructure.

17. The method of claim 11, wherein the coating is performed by filtering the carbon nanostructure-metal composite by the membrane support and compressing the carbon nano structure-metal composite remaining in the membrane support.

18. The method of claim 11, wherein the carbon nanostructure-metal composite is manufactured by mixing a metal precursor with a dispersion of a carbon nanostructure dispersed in a reducing solvent and heating the resulting mixture.

19. The method of claim 11, wherein the carbon nanostructure-metal composite is manufactured by mixing the metal precursor with the dispersion further including a stabilizer and heating the resulting mixture.

20. The method of claim 11, wherein carbon nanostructure-metal composite is mixed and dispersed at an amount of 10 to 50 parts by weight based on 100 parts by weight of the surfactant.

21. The method of claim 11, wherein the solvent is selected from the group consisting of water, alcohol, polyols, glycol ethers and a mixture thereof.

* * * * *